US005243510A

United States Patent [19]

Cheney, II

[11] Patent Number: 5,243,510

[45] Date of Patent: Sep. 7, 1993

[54] PLUG-IN POWER SUPPLY ADAPTER WITH COMPONENTS IN THE STRAIN RELIEF MEMBER

[75] Inventor: Paul S. Cheney, II, Canyon Country, Calif.

[73] Assignee: Siemens Infusion Systems, Sylmar, Calif.

[21] Appl. No.: 896,900

[22] Filed: Sep. 10, 1992

Related U.S. Application Data

[63] Continuation of Ser. No. 635,905, Dec. 27, 1990, abandoned.

[51] Int. Cl.[5] .......... H02M 7/06

[52] U.S. Cl. .......... 363/146; 363/126; 439/447; 439/620

[58] Field of Search .......... 336/92, 107; 320/2; 363/126, 146; 439/447, 620, 909; 174/135

[56] References Cited

U.S. PATENT DOCUMENTS

| | | | |
|---|---|---|---|
| 3,530,350 | 9/1970 | Gawron | 363/146 |
| 3,725,848 | 4/1973 | Davidson . | |
| 3,800,068 | 3/1974 | Torgerson | 439/447 |
| 3,833,821 | 9/1973 | Weaver | 307/151 |
| 3,983,407 | 9/1976 | Shott | 439/620 |
| 4,086,523 | 4/1978 | Izumi | 320/2 |
| 4,345,223 | 8/1982 | Chien-Chun | 439/620 |
| 4,519,015 | 5/1985 | Lin | 336/107 |
| 4,606,597 | 8/1986 | Bielefeld | 439/620 |
| 5,106,317 | 4/1992 | Taylor | 439/173 |

FOREIGN PATENT DOCUMENTS

| | | | |
|---|---|---|---|
| 1883372 | 10/1984 | Japan | 363/146 |

*Primary Examiner*—William H. Beha, Jr.
*Attorney, Agent, or Firm*—Leslie S. Miller

[57] ABSTRACT

An improved power supply adapter is provided for plug-in connection to a standard AC power supply receptacle, and to provide a DC voltage to an associated electronic instrument. The power supply adapter comprises a relatively compact case having an end face with a plurality of conductive prongs protruding therefrom for plug-in connection to an AC receptacle, such as one socket of a standard duplex or quad wall outlet or the like. An AC adapter assembly is mounted within the adapter case with the components of the AC adapter assembly arranged generally in-line between the conductive prongs and a power cord adapted for connection to the associated electronic instrument. This in-line geometry permits the adapter case to have a relatively narrow width and low profile height conforming with a single electrical socket, whereby plug-in connection of the adapter to an electrical socket does not obstruct access to adjacent sockets. In addition, in a preferred form, the adapter case further includes a mounting clip for convenient removable connection to the associated electronic instrument when the power supply adapter is not in use.

11 Claims, 4 Drawing Sheets

PLUG-IN POWER SUPPLY ADAPTER WITH COMPONENTS IN THE STRAIN RELIEF MEMBER

This is a continuation of co-pending application Ser. No. 07/635,905 filed on Dec. 27, 1990 now abandoned.

BACKGROUND OF THE INVENTION

This invention relates generally to an improved AC adapter of the type used to provide a DC voltage to an associated electronic instrument from an AC supply voltage. More particularly, this invention relates to a compact and low profile power supply adapter for plug-in connection to a standard electrical socket, without obstructing or interfering with adjacent electrical sockets of a standard duplex or quad wall outlet or the like. The invention is particularly designed for use with electronic instruments in a medical environment, and further includes means for removably mounting the power supply adapter onto or in close association with the instrument when not in use.

Modern medical treatment facilities utilize a variety of sophisticated electronic instruments in the course of patient diagnosis and treatment. As one common example, electronically operated medication infusion pumps are commonly used for administering one or more selected medical fluids to a patient at a prescribed flow rate and time schedule. Such fluid medication infusion pumps and other electronic equipment require a source of electrical power to maintain the instrument in a desired operational state.

In this regard, many electronic instruments designed for medical as well as nonmedical uses are constructed to operate on a DC power supply which can be obtained in the alternative from batteries or by use of an appropriate transformer and rectifier connected to a standard AC power source. In this latter case, the AC adapter frequently comprises a power supply adapter designed for direct plug-in connection to an AC power supply outlet, with an elongated cord extending between the plug-in adapter and the associated electronic instrument used to supply DC to the instrument.

In the past, plug-in power supply adapters have included a relatively compact housing or case having the components of an AC adapter mounted therein. Conductive prongs associated with the transformer components have protruded outwardly from the adapter case for plug-in connection in the manner of a standard electrical plug with an associated AC power supply receptacle, such as one socket of a standard duplex or quad wall outlet, or a multisocket strip, or the like.

Accordingly, the adapter case essentially comprises the body of an electrical plug for manual grasping in the course of plug-in and unplugging movements. However, the physical size and shape of the adapter case has typically exceeded the width and height of a conventional electrical plug, such that the adapter case partially overlies and therefore obstructs access to adjacent electrical sockets. For example, in a conventional duplex or quad wall outlet, plug-in connection of a single AC/DC power supply adapter to one of the electrical sockets normally obscures and thus precludes access to all of the remaining electrical sockets in the wall outlet. Additional electrical devices which may be desired or necessary, especially in a medical treatment facility must therefore be plugged into a different wall outlet.

Moreover, in a medical treatment environment, it is often necessary to transport electronic medical instruments from one place to another. For example, fluid infusion pumps are often transported with patients throughout different areas of a hospital or the like, or from one patient room to another for use with different patients as the need arises. While such instruments may be battery powered for short term operation in a mobile environment, it is important that the electrical power cord and associated power supply adapter remain with the instrument so that normal operation can be resumed quickly and easily by mere plug-in connection of the adapter to a power supply outlet.

However, transport of the power supply adapter and associated cord with the instrument poses particular problems in that the adapter is relatively heavy and thus difficult to transport with the instrument in a secure and stable manner and/or can become easily separated from the instrument and is thus relatively easily misplaced.

There exists, therefore, a significant need for an improved power supply adapter of the plug-in type wherein the adapter can be plugged into a standard electrical socket without interfering with access to adjacent sockets, and further wherein the adapter includes means for convenient and stable mounting in a stored position in association with an electronic instrument for transport purposes. The present invention fulfills these needs and provides further related advantages.

SUMMARY OF THE INVENTION

In accordance with the invention, an improved power supply adapter is provided for plug-in connection to a standard AC power supply receptacle and to provide a DC voltage to an associated electronic instrument, particularly such as a medical instrument. The power supply adapter is designed with an AC adapter assembly mounted within a compact adapter case having an end face with conductive plug prongs protruding therefrom. The components of the transformer assembly are arranged generally in-line between the conductive prongs and a power cord, such that the case can be constructed with a narrow width and low profile height to avoid obstructing adjacent electrical sockets of a standard duplex or quad wall outlet or the like.

The case of the power supply adapter further includes means for relatively simple removable mounting in a stored position on or in close association with the electronic instrument when the power supply adapter is not in use. In a preferred form, the mounting means comprises a mounting clip formed integrally with the adapter case for secure yet removable mounting onto a bracket arm or other support structure associated with the electronic instrument.

Other features and advantages of the present invention will become more apparent from the following detailed description, taken in conjunction with the accompanying drawings which illustrate, by way of example, the principles of the invention.

DESCRIPTION OF THE DRAWINGS

These and other advantages of the present invention are best understood with reference to the drawings, in which.

DETAILED DESCRIPTION OF THE PREFERRED EMBODIMENT

Figure 1:
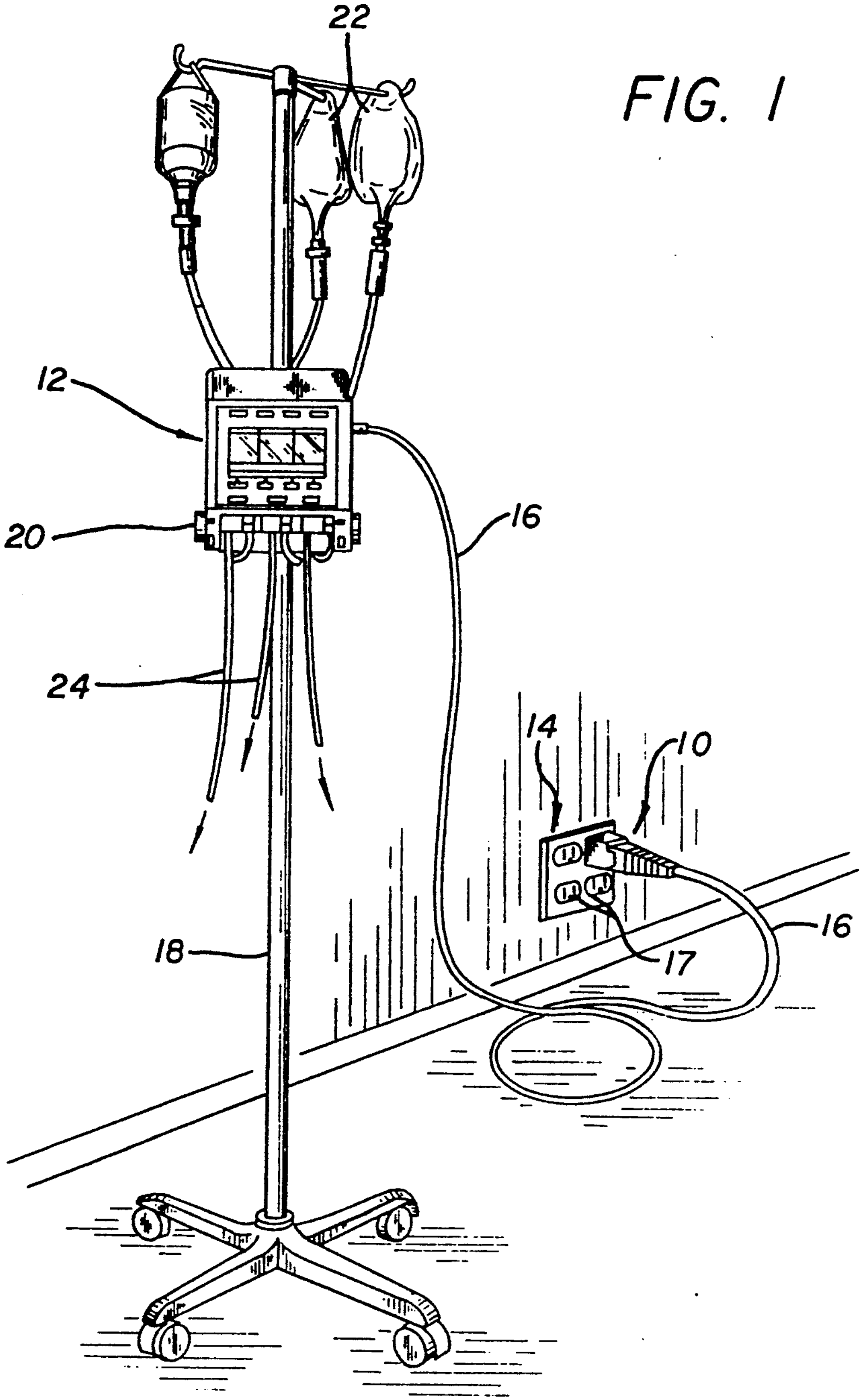
FIG. 1 is a front perspective view illustrating an electronic medical instrument with an associated power cord and a plug-in power supply adapter embodying the novel features of the invention.

As shown in the exemplary drawings, an improved AC adapter referred to generally in FIG. 1 by the reference numeral 10 is provided for use with an electronic instrument 12, such as a fluid medication infusion pump. The power supply adapter 10 is designed for quick and easy plug-in connection to a standard AC power supply receptacle 14, and to provide a DC voltage via a power cord 16 to the electronic instrument 12. The AC adapter 10 is particularly constructed with an elongated geometry having a relatively narrow width and low profile height, such that the AC adapter 10 does not obstruct or otherwise interfere with access to adjacent electrical sockets 17 of a multisocket receptacle 14.

Although the power supply adapter 10 of the present invention may be used with a wide range of electrical and/or electronic instruments, the illustrative drawings show the adapter 10 in a preferred environment of use, namely, in association with an electronic instrument 12 in a medical environment. FIG. 1 illustrates the instrument 12 in the form of a fluid medication infusion pump corresponding with the MiniMed III fluid infusion pump marketed by MiniMed Technologies of Sylmar, Calif., which infusion pump shall also be referred to by the reference numeral 12.

The illustrative infusion pump 12 comprises a relatively compact instrument adapted for mounting onto a conventional portable medical equipment pole 18 by means of an appropriate clamp fixture 20, such as an adjustable clamp fixture of the type described in U.S. Pat. No. 4,832,299, which is incorporated by reference herein. The infusion pump 12 is shown to include multiple parallel pumping systems for independent programming and control to regulate administration of multiple medical fluids from appropriate reservoirs 22 to the patient (not shown) via suitable tubing 24.

The electronic control components and associated electronically powered pumping devices are integrated into the housing of the infusion pump 12. The infusion pump 12 is designed for normal operation by connection to an appropriate 120 volt AC power supply receptacle 14 by means of the AC adapter 10 and the power cord 16, with the AC adapter 10 comprising an adapter for supplying a selected DC voltage to the infusion pump 12.

Figure 2:
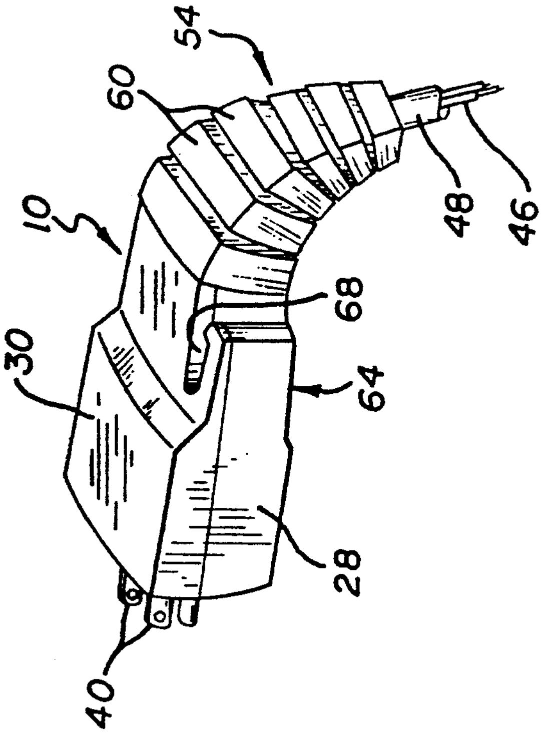
FIG. 2 is an enlarged rear perspective view of the power supply adapter.
Figure 3:
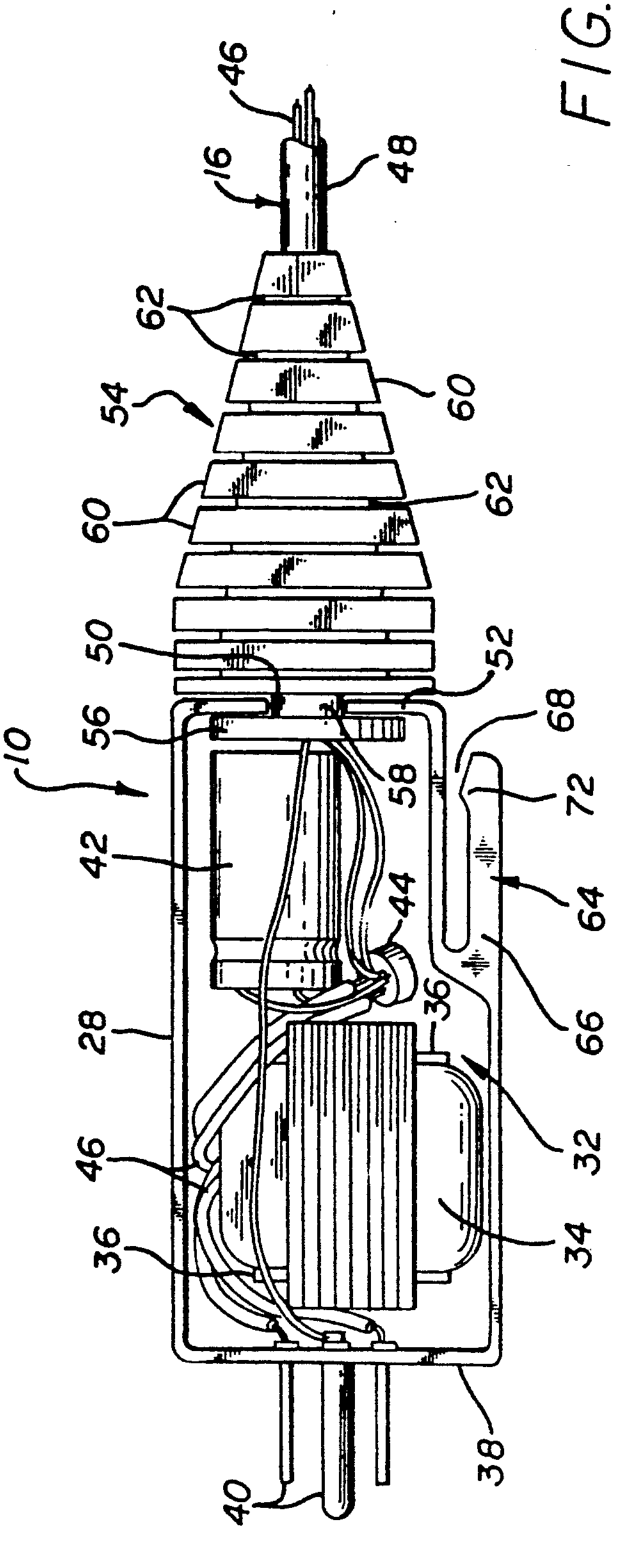
FIG. 3 is an enlarged top plan view of the power supply adapter, with a portion of the adapter case removed to illustrate the arrangement of components of an AC adapter assembly.
Figure 4:
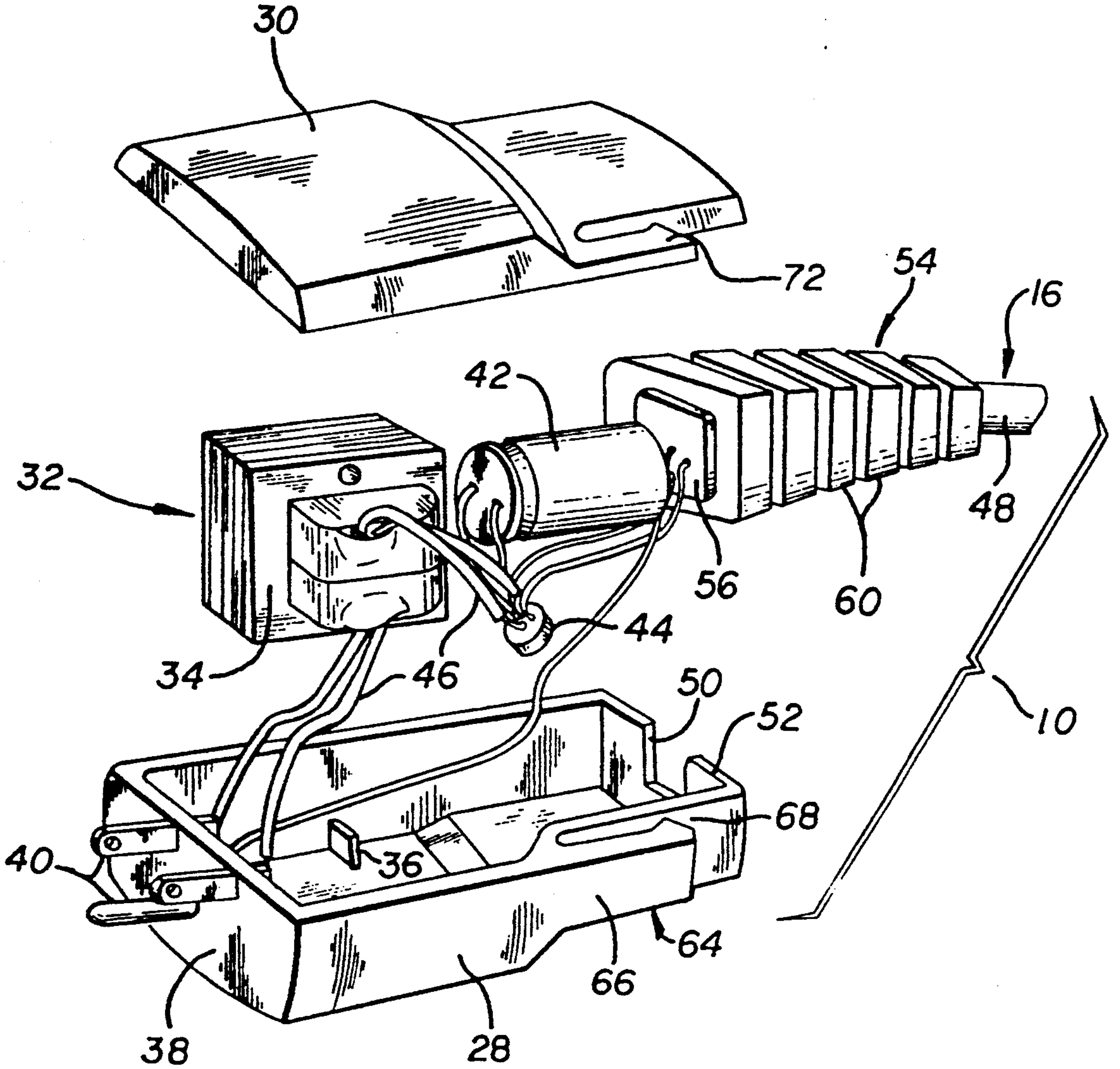
FIG. 4 is an exploded perspective view of the power supply adapter.

As shown best in FIGS. 2–4, the AC adapter 10 includes a relatively compact housing or case defined by a lower base 28 and an upper cap 30. These case components, in the preferred form, are constructed from a relatively lightweight and high impact molded plastic, such as glass-filled nylon. The base 28 and the cap 30 have a generally shell-shaped configuration which cooperatively define a hollow case interior for receiving and supporting the components of an AC adapter electrical assembly 32.

More specifically, the AC adapter electrical assembly 32 comprises a transformer 34 securely seated within the base 28 in a nested or cradled relation with respect to a plurality of short locator tabs 36. The transformer 34 is positioned in close proximity with a forward end wall 38 from which a plurality of conductive prongs 40 protrude in a conventional three prong array for plug-in connection to the AC power supply receptacle 14. In the preferred form, these conductive prongs 40 are securely mounted near their rear ends within the end wall 38 as by means of insert molding or the like.

The remaining components of the AC adapter electrical assembly 32 are mounted within the adapter case in a generally in-line configuration with respect to the transformer 34 and the conductive prongs 40. FIGS. 3 and 4 show these remaining components in the form of a filter capacitor 42 and a rectifier 44. All of these transformer components are appropriately coupled electrically by means of suitable conductive wires 46.

A selected trio of the wires 46 are assembled within a protective outer sheath 48 to define the power cord 16 connected to the associated electronic instrument 12. In this regard, these conductive wires 46 are suitably collected for passage through a notch 50 formed in a rear end wall 52 of the base 28. A strain relief fitting 54 is mounted at the rear end wall 52 and defines a flexible structural member connected between the base 28 and the power cord 16 to anchor the power cord 16 securely to the adapter 10.

In other words, the strain relief fitting 54 has a mounting head plate 56 at one end thereof for seated reception against an inboard side of the rear end wall 52 on the base 28, with a narrow neck 58 adjacent the head plate 56 and sized for close-fit reception through the open notch 50. From the neck 58, the strain relief fitting 54 includes an alternating sequence of plate and neck segments 60 and 62 which define a flexible structure to securely retain the associated end of the power cord 16 therein.

Importantly, the strain relief fitting 54 is designed to permit flexure (FIG. 2) substantially at the adapter case as may be required for adapter use in close clearance locations. Moreover, the fitting 54 is designed to prevent or resist cord breakage at the adapter as may otherwise occur, for example, when the adapter is unplugged by pulling on the power cord 16.

With the AC adapter electrical assembly 32 installed within the lower base 28 and the strain relief fitting 54 mounted thereto, the adapter case is closed by mounting the cap 30 onto the base 28. Such mounting may occur by use of snap-fit connections, ultrasonic welding, and/or adhesive, with a permanently closed adapter case construction being desired.

The resultant AC adapter 10 includes the components of the AC adapter electrical assembly 32 in a substantially in-line arrangement between the conductive prongs 40 and the power cord 16. The adapter 10 thus has an elongated shape which can be easily grasped and/or manipulated manually for plug-in connection to and unplugging from a power supply receptacle.

The elongated AC adapter electrical assembly 32 further presents a relatively narrow width and low profile height conforming generally with the dimensions of a standard electrical power plug, such that plug-in connection of the AC adapter 10 to an electrical socket 17 (FIG. 1) does not interfere with or otherwise obstruct access to adjacent electrical sockets 17 of a typical duplex, quad, or strip outlet 17. As a result, the adjacent sockets 17 remain available for easy access and plug-in connection with other electronic instruments as may be necessary or desirable.

Although the specific size and shape of the AC adapter 10 of the present invention may vary according to a range of design criteria, it is noted that the width and height of the adapter case are predominantly a function of the size and shape of the transformer 34. In this regard, through the use of a compact transformer such as that available from ISL Products International, Ltd., of Syosset, N.Y., under model designation EI 41, it has been possible to construct an AC adapter 10 with a low profile height of about 1.5 to 1.6 inch and a narrow width of about 1.7 to 1.8 inch.

In accordance with further aspects of the improved AC adapter 10 of the present invention, the assembled adapter case defines a rearwardly projecting mounting clip 64 for convenient removable mounting of the AC adapter 10 in a stored position with respect to the associated electronic instrument 12. The clip 64 is shown in the form of a rearwardly projecting clip leg 66 formed integrally with the base 28 and/or cap 30 at one side of the case. Conveniently, to prevent undesired increase in the case width or height, the clip leg 66 is formed as a continuation of a wider frontal portion of the case within which the transformer core 34 is mounted, but in spaced relation with a narrow rear case portion having the filter capacitor 42 therein.

Figure 5:
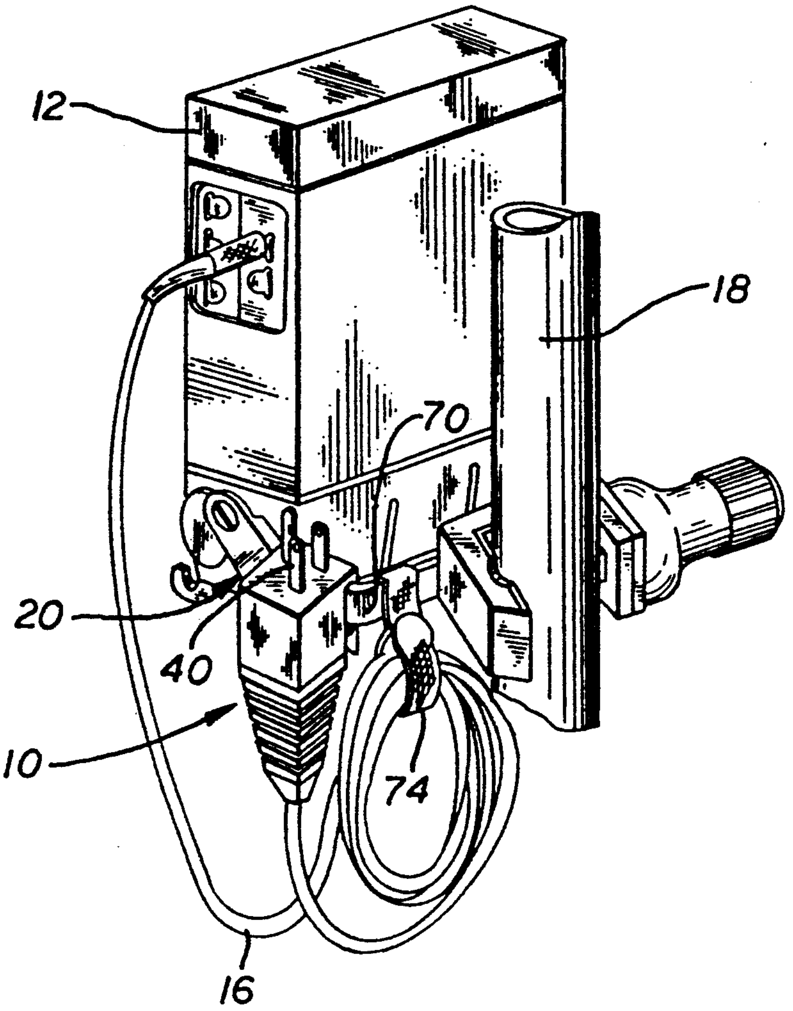
FIG. 5 is a fragmented perspective view illustrating mounting of the power supply adapter in a stored position in association with the electronic instrument of FIG. 1.

In the preferred form, the clip leg 66 cooperates with the narrow rear portion of the case to define a rearwardly open slot 68 sized for reception of a bracket arm 70 of the clamp fixture 20, as viewed in FIG. 5. That is, the clip 64 permits the adapter 10 to be removably mounted quickly and easily onto the bracket arm 70 in close stored association with the medical instrument 12. A lock tooth 72 at the inboard free end of the clip leg 66 includes tapered leading and trailing edges for facilitating secure clip-on mounting and subsequent removal of the adapter 10 from the bracket arm 70.

A support strap 74 having Velcro-type fasteners may also be mounted onto the bracket arm 70 for releasably supporting the power cord 16 in a coiled or other suitably compact configuration.

Figure 6:
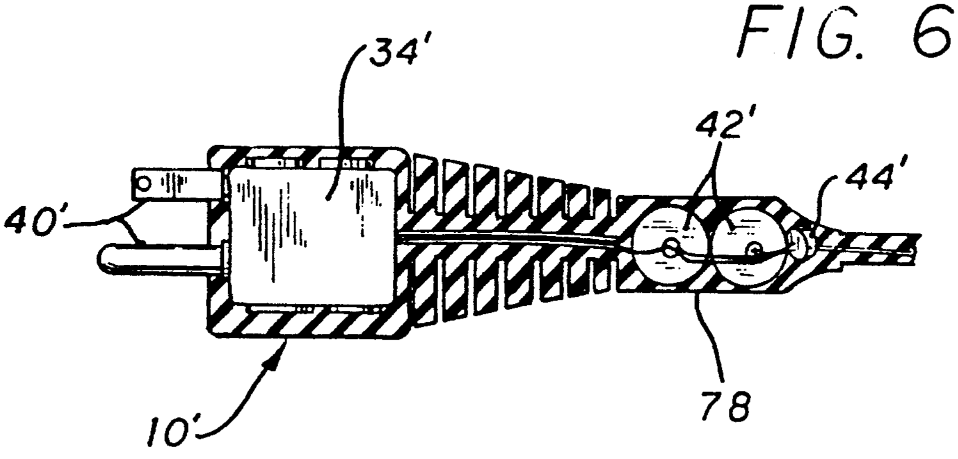
FIG. 6 is a sectional view depicting an alternative preferred form of the power supply adapter.

One alternative preferred form of the improved power supply adapter is shown in FIG. 6, with components corresponding generally with those shown and described in FIGS. 1-5 being identified by common primed reference numerals. As shown, a modified adapter 10′ includes a transformer 34′ mounted within a compact case in in-line relation with a plurality of conductive plug prongs 40′. The remaining components of The AC adapter 10′ include one or more filter capacitors 42′ and a rectifier 44′, which are insert molded within a separate case portion 78 spaced rearwardly from the transformer 34′.

A strain relief fitting 54′ is interposed between the transformer 34′ and the capacitors 42′ and the rectifier 44′, with all of the components again positioned in a generally in-line configuration between the prongs 40′ and a power cord 16′.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. An electrical power supply adapter for plug-in connection to an electrical socket connected to an AC power supply, said electrical power supply adapter comprising:

an adapter case having a proximal end and a distal end;

a strain relief fitting tapered from a larger distal end to a smaller proximal end, said distal end of said strain relief fitting being mechanically connected to and extending from said proximal end of said adapter case, said adapter case and said strain relief fitting together comprising an adapter housing having distal and proximal opposite ends, said adapter housing being relatively longer between said distal and proximal ends than it is wide;

a plurality of conductive prongs extending from said distal end of said adapter housing for plug-in connection to the electrical socket connected to the AC power supply;

a DC power cord extending from said proximal end of said adapter housing; and an AC adapter electrical assembly having a plurality of electrical components mounted within said adapter housing in an arrangement disposed generally proximally with respect to said prongs, said AC adapter electrical assembly having an AC electrical input which is electrically connected to at least two of said plurality of conductive prongs, said AC adapter having at least one relatively large component located in said adapter case and at least two smaller components located in said strain relief fitting, said two smaller components thus being disposed proximally with respect to said at least one larger component, said AC adapter electrical assembly having a DC output which is electrically connected to said DC power cord.

2. An electrical power supply adapter as defined in claim 1, wherein said two smaller components are located at said proximal end of said strain relief fitting.

3. An electrical power supply adapter as defined in claim 1, wherein said at least one larger component comprises:

a transformer located within said adapter housing generally adjacent to said distal end thereof, said transformer being electrically connected to two of said plurality of conductive prongs.

4. An electrical power supply adapter as defined in claim 3, wherein said two smaller components comprise:

at least one filter capacitor; and a rectifier, said filter capacitor and said rectifier being electrically connected between said transformer and said DC power cord.

5. An electrical power supply adapter as defined in claim 4, wherein said filter capacitor and said rectifier are located within said adapter housing generally adjacent to said proximal end thereof.

6. An electrical power supply adapter as defined in claim 1, further comprising:

a mounting clip located on a side of said adapter housing.

7. An electrical power supply adapter as defined in claim 6, wherein said mounting clip is formed integrally with said adapter housing.

8. An electrical power supply adapter for plug-in connection to an electrical socket connected to an AC power supply, said electrical power supply adapter comprising:

first and second adapter housing members each having a distal end and a proximal opposite end, said first adapter housing member having a first cavity disposed therein and said second adapter housing member having a second cavity disposed therein;

an intermediate member disposed between said proximal end of said first adapter housing member and said distal end of said second adapter housing member, said first and second adapter housing members and said intermediate member together comprising an adapter member, said adapter member being relatively longer between said distal end of said first adapter housing member and said proximal end of said second adapter housing member than it is wide, said adapter member being generally tapered from a larger size at said distal end of said first adapter housing member to a smaller size at said proximal end of said second adapter housing member;

a plurality of conductive prongs extending from said distal end of said first adapter housing member for plug-in connection to the electrical socket connected to the AC power supply;

a DC power cord extending from said proximal end of said second adapter housing member;

a transformer located inside said first cavity in said first adapter housing member, said transformer being electrically connected to two of said conductive prongs; and a filter capacitor and a rectifier located inside said second cavity in said second adapter housing member, said filter capacitor and said rectifier being electrically connected to said transformer, said filter capacitor and said rectifier also being electrically connected to said DC power cord.

9. An electrical power supply adapter as defined in claim 8, wherein said adapter member is flexible.

10. An electrical power supply adapter as defined in claim 8, additionally comprising:

a clip located on said first adapter housing member for removably mounting said electrical power supply adapter onto a device with which said electrical power supply adapter is to be used.

11. A method of making an electrical power supply adapter for plug-in connection to an electrical socket connected to an AC power supply, said method comprising:

supplying an adapter case having a proximal end and a distal end;

mechanically connecting a strain relief fitting tapered from a larger distal end to a smaller proximal end at said distal end thereof to said proximal end of said adapter case, said adapter case and said strain relief fitting together comprising an adapter housing having distal and proximal opposite ends, said adapter housing being relatively longer between said distal and proximal ends than it is wide;

mounting a plurality of conductive prongs in extending fashion from said distal end of said adapter housing for plug-in connection to the electrical socket connected to the AC power supply;

extending a DC power cord from said proximal end of said adapter housing; and installing an AC adapter electrical assembly having a plurality of electrical components within said adapter housing in an arrangement disposed generally proximally with respect to said prongs, said AC adapter electrical assembly having an AC electrical input which is electrically connected to at least two of said plurality of conductive prongs, said AC adapter having at least one relatively large component located in said adapter case and at least two smaller components located in said strain relief fitting, said two smaller components thus being disposed proximally with respect to said at least one larger component, said AC adapter electrical assembly having a DC output which is electrically connected to said DC power cord.

* * * * *

UNITED STATES PATENT AND TRADEMARK OFFICE
CERTIFICATE OF CORRECTION

PATENT NO. : 5,243,510

DATED : September 7, 1993

INVENTOR(S) : Paul S. Cheney, II

It is certified that error appears in the above-identified patent and that said Letters Patent is hereby corrected as shown below:

Title page , at item [22], the official filing date is: June 10, 1992.

Signed and Sealed this

Third Day of January, 1995

Attest:

BRUCE LEHMAN

*Attesting Officer* *Commissioner of Patents and Trademarks*